Jan. 5, 1932.  R. K. TIFFANY  1,839,617
STORE CONSTRUCTION
Filed Feb. 1, 1930   5 Sheets-Sheet 2
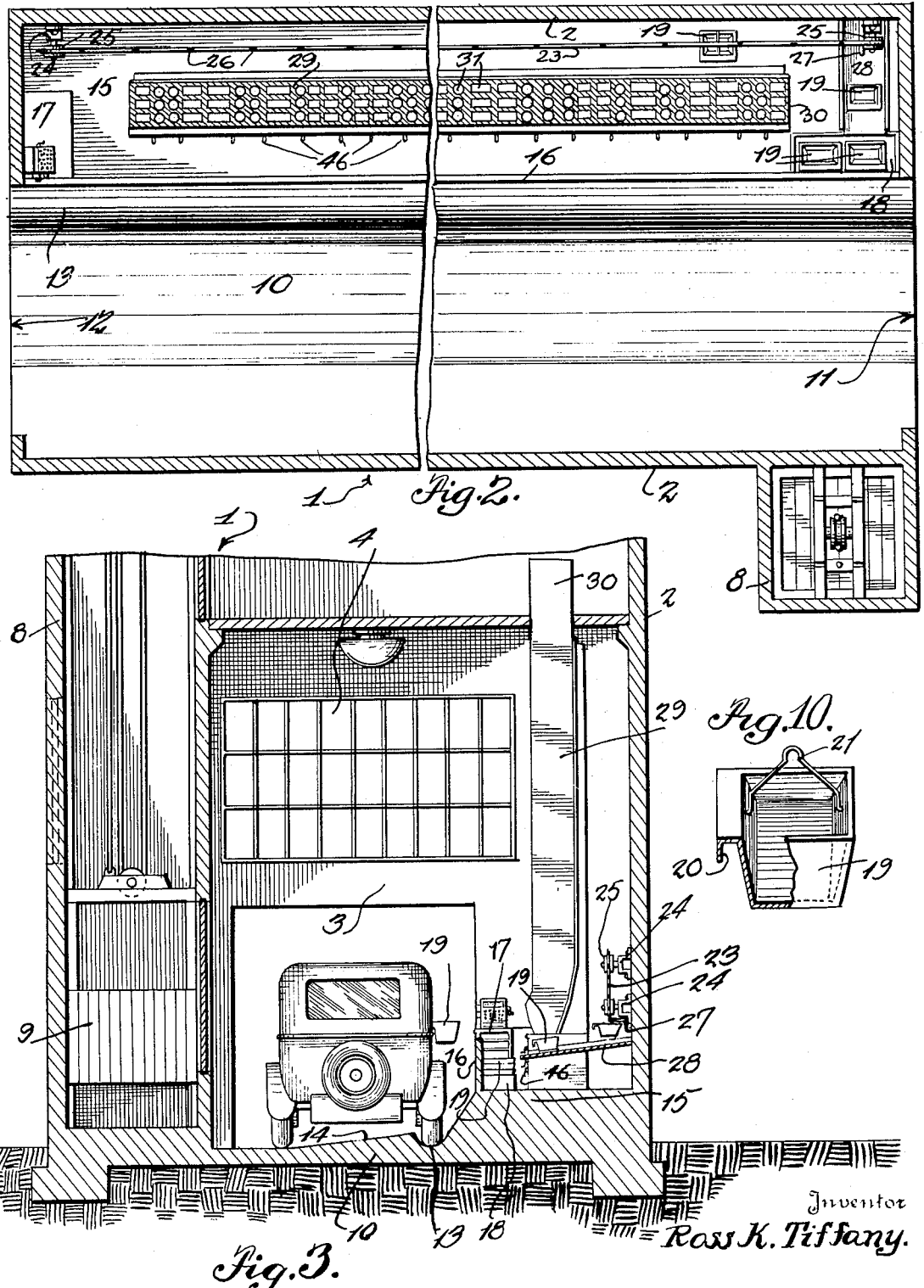
Inventor
Ross K. Tiffany.
By Linton, Kellogg & Smith
Attorneys

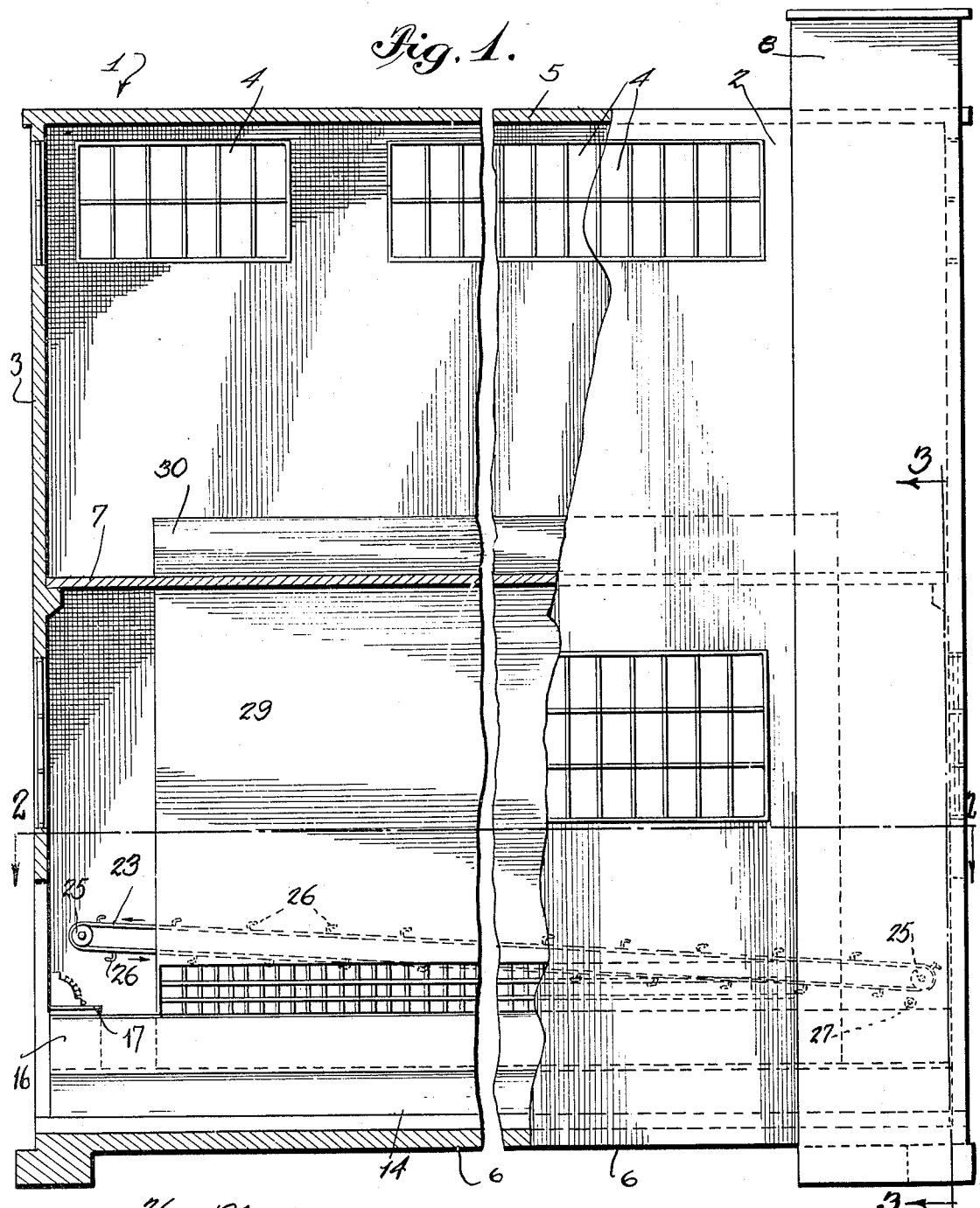

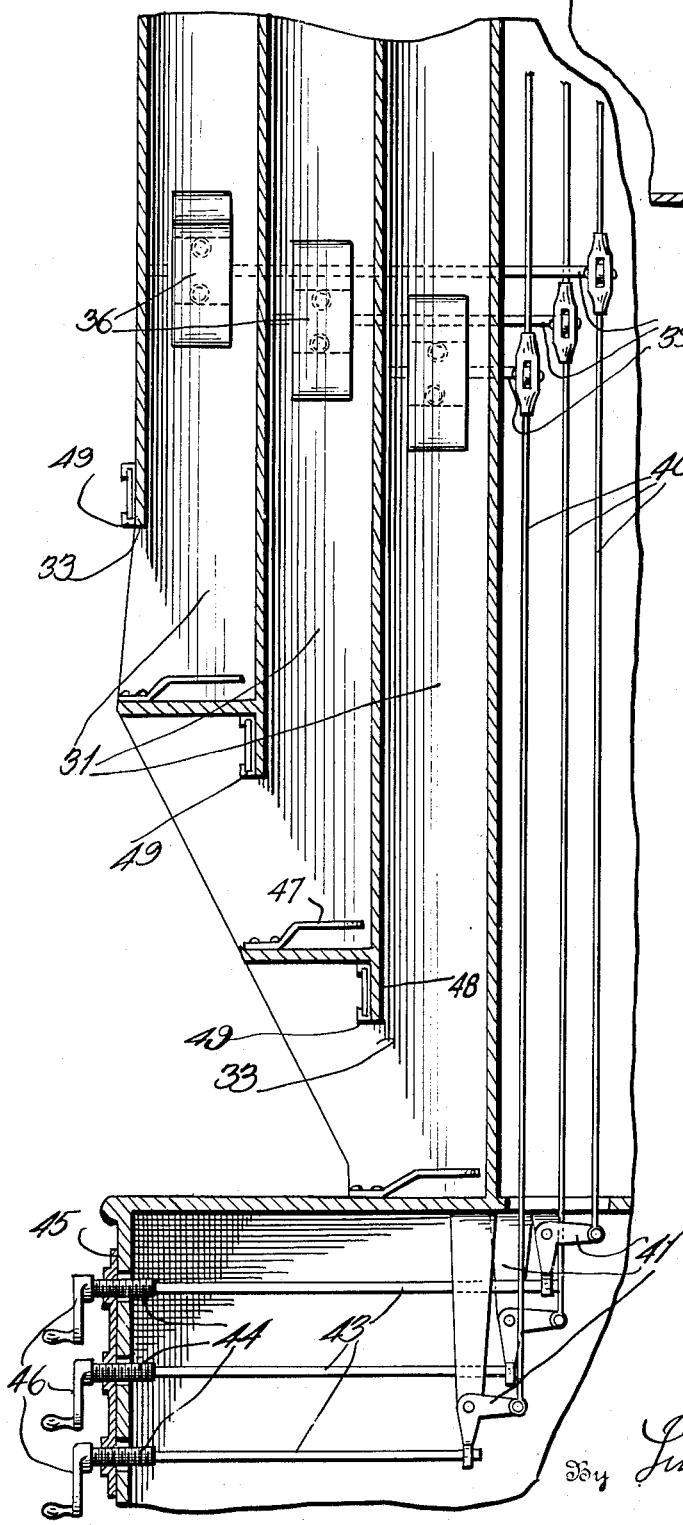

Jan. 5, 1932.  R. K. TIFFANY  1,839,617
STORE CONSTRUCTION
Filed Feb. 1, 1930   5 Sheets-Sheet 4

Inventor
Ross K. Tiffany.
By Linton, Kellogg Smith
Attorneys

Jan. 5, 1932.  R. K. TIFFANY  1,839,617
STORE CONSTRUCTION
Filed Feb. 1, 1930   5 Sheets-Sheet 5

Inventor
Ross K. Tiffany.
By Linton, Kellogg & Smith
Attorneys.

Patented Jan. 5, 1932

1,839,617

UNITED STATES PATENT OFFICE

ROSS K. TIFFANY, OF OLYMPIA, WASHINGTON

STORE CONSTRUCTION

Application filed February 1, 1930. Serial No. 425,236.

The present invention relates to store constructions and aims to provide a store through which vehicles may pass without interruption and wherein goods or articles of merchandise are properly displayed to occupants of the vehicles, and purchases may be readily made from the vehicles without leaving the same.

The invention further contemplates the provision of a store so constructed that very little land space is required for its erection, whereby the store may be built in congested districts to give efficient service to the purchasing public.

It is also amongst the desired purposes of the invention to provide a two-story store construction wherein the main or ground floor is designed to form a run-way for motor vehicles and is provided with a raised platform adjacent the run-way from which service can be rendered in a most efficient and convenient manner, while the second or top floor may be utilized for storage purposes, said top floor communicating with the main floor by means of a combined conveyor and display rack leading to the platform from which service is given.

A still more specific object of the invention resides in the provision of a store consisting of a two-story construction, the lower or ground floor having a service platform wherefrom attention may be given to patrons passing through the building in motor vehicles and the top or upper floor serving as a storage space and communicating with the service platform on the ground floor by means of a combined conveyor and display rack, each adapted to receive and retain a certain line of goods or articles of merchandise to be sold to the patrons; said rack being formed of series of parallel compartments provided with means for retarding the fall of the articles and preventing their accidental discharge from the rack; the rack being further designed to effect a clear and visual display of the goods placed therein and to carry striking indications, such as advertising matter, price quotations, etc.

Another important feature of the invention consists in the provision of a store through which a vehicle may pass without interruption, the vehicle upon entering the store at one end thereof, to be supplied with a receptacle designed for ready attachment to said vehicle and adapted to receive goods or articles purchased by the occupants of the vehicle while running through the building; the occupants of the vehicle, upon leaving the building at the other end thereof, paying for the goods, and the receptacle returned to the entrance end of the building through conveyor means.

Other important objects and advantages of the invention will be in part obvious and in part pointed out hereinafter.

In order that the invention and its mode of operation may be readily understood by persons skilled in the art, I have in the accompanying illustrative drawings, and in the detailed following description based thereon, set out a possible embodiment of the same.

In these drawings:

Figure 1 is a side elevation of a store, with a portion thereof in section, constructed in accordance with my invention;

Figure 2 is a horizontal section taken on line 2—2 of Figure 1 in the direction indicated by the arrows;

Figure 3 is a vertical transverse section taken on line 3—3 of Figure 1;

Figure 4 is a section through the combined conveyor and display rack embodied in my invention and showing merchandise arranged therein;

Figure 5 is an enlarged detail section of the rack and illustrating the control mechanism associated therewith;

Figure 9 is a detail illustration of the basket conveying means; and

Figure 10 is a detail perspective of the basket or receptacle adapted to be attached to the vehicle;

Figure 6:
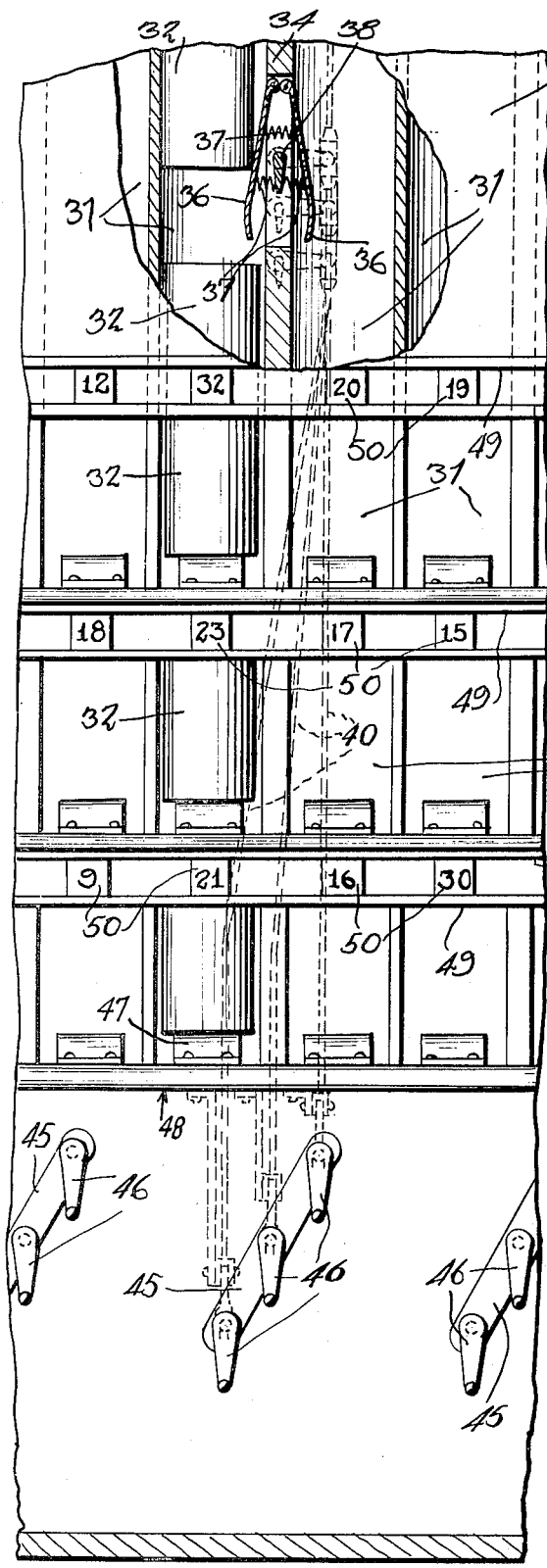
Figure 6 is a front elevation of Figure 5 with parts in section.
Figure 7:
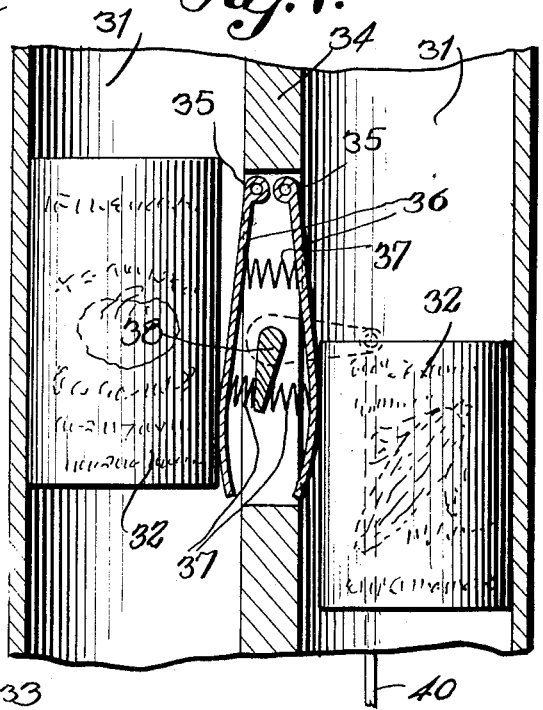
Figures 7 and 8 are enlarged details illustrating the operation of parts of the control mechanism in various positions.
Figure 8:
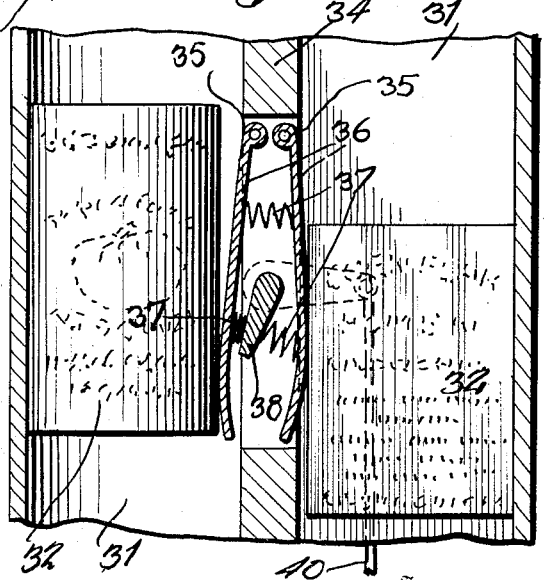

Referring now more particularly to the drawings wherein like characters of reference will designate corresponding parts throughout, I provide a suitable building indicated in its entirety for convenience herein by the numeral 1, having side and end walls 2 and 3, respectively, with windows 4 and roof structure 5. The building is preferably one of the two-story type with a lower or ground floor 6 and an upper or top floor 7. The building further is preferably constructed with an elevator shaft built upon one side of the building and wherein the elevator 9 may be operated to transport merchandise to the top floor.

The lower or ground floor 6 is provided with a run-way 10 extending longitudinally of and directly through the building and having its entrance 11 at one end of the building and its exit 12 at the other end. The run-way, as more clearly illustrated in Figure 3 of the drawings, has along one side, a gutter 13 forming a guide-way for the wheels of a vehicle while traversing the run-way and slopes downwardly from the adjacent wall of the gutter, as shown at 14. On the opposite side of the gutter 13 and adjacent the run-way 10, the floor 6 is gradually elevated to form a suitable service platform 15 extending to the adjacent side wall of the building.

Erected along the ledge of the platform 15, is a balustrade 16 arranged to prevent accidental falling of persons or things from the platform 15 into the adjacent run-way 10.

Upon one end of the platform 15, near the exit 12 of the run-way 10, is mounted a cashier's desk 17, while upon the opposite end of the platform near the entrance 11 of said run-way, is provided a basket bin 18, from which baskets or receptacles 19 may be readily taken and attached to vehicles entering the run-way, to be carried thereby while going through the building.

For the purpose of facilitating the attachment of the basket 19 to the vehicle, I provide said baskets, as more clearly shown in Figure 10, with an angular flange 20, preferably formed integral with one side of the baskets or receptacles, said flange being designed to have engagement with suitable or convenient parts of the vehicle. The baskets 19 are also provided with a bail handle 21 pivoted to opposite sides of the baskets.

At the rear of the service platform 15, and in parallel relation thereto, is an endless conveyor 23 mounted upon the adjacent side wall of the building by means of two spaced brackets 24 supporting the wheels 25 of the conveyor, said brackets being mounted, one near the cashier's desk 17 and the other near the bin 18.

The outer side of the endless conveyor 23 carries a plurality of relatively spaced L-shaped hooks 26 with their free ends pointed in a direction opposed to that of movement of the conveyor, as more fully illustrated in Figure 9, and adapted to engage the bail handles 21 of the baskets 19. Because of this, it will be understood, that the baskets 19, when being removed from the vehicle at the cashier's desk 17, may be returned to the basket bin through the conveyor 23.

For the purpose of disengaging the baskets 19 from the conveyor 23 upon reaching that end of the conveyor near the basket bin 18, I provide a laterally projecting rod or bar 27 supported adjacent the conveyor 23 and adapted to contact with portions of the baskets to force the same out of engagement with the hook 26 from which said basket is suspended. That means may be provided to receive the baskets 19 when disengaged from the conveyor, a suitable table 28 is fixed below adjacent portions of the conveyor. The table 28 is preferably inclined towards the basket bin 18 so that the baskets may be easily removed therefrom and replaced in the basket bin 18 for subsequent use.

It will, of course, be understood that the conveyor 18 may be operated manually or by means of any suitable driving devices known in the art, but I prefer to employ the simplified arrangement disclosed in the drawings. In this arrangement, I mount the spaced brackets 24 supporting the wheels 25 of the conveyor 23 at different heights, that is, the bracket disposed near the cashier's desk 17 is fixed at a higher point than the bracket near the basket bin 18, as clearly indicated in Figures 1 and 3, whereby the endless conveyor 23 will be given a slanting position. By reason of this, when one or more baskets are attached to the hooks 26 of the conveyor, the weight of the basket or baskets will cause the conveyor to move by gravity in a practically automatic fashion.

Disposed forwardly of the endless conveyor 23 upon the service platform 15 and arranged longitudinally thereof, is a combined conveyor and display rack 29 rising vertically from said platform of the lower or ground floor 6 to the upper or top floor 7 and extending into the latter as indicated at 30. This combined conveyor and display rack is formed of a series of parallel compartments 31 each adapted to receive and retain a certain line of goods or articles of merchandise 32 placed in said compartments from the top floor 7, serving, as hereinbefore stated, for storing purposes. The lower ends of the compartments 31 of each series terminate one above the other, as better shown in Figures 4, 5 and 6 of the drawings, and are provided with transverse openings 33 permitting the goods or articles of merchandise to be effectively displayed therethrough.

At spaced intervals along certain of the vertical walls 34 defining the compartments 31 of the combined conveyor and display rack 29, are formed recesses 35 wherein are transversely pivoted pairs of opposed plates 36 normally urged outwardly of the recesses 35 and into the adjacent compartments 31 by means of coil springs 37 interposed and retained between said plates. From the described arrangement of the spring actuated plates 36, it will be manifest that the latter will come into frictional contact with the goods or articles of merchandise 32 in the compartments 31 to prevent a too sudden fall of said merchandise and reduce the possibilities of deterioration of the goods.

That the tension of the coil springs 37 against the plates 36 may be regulated at will to accomodate merchandising packages or cans of various sizes, arms 38 are movably mounted between the plates 36 to act upon said springs 37. The arms 38 are rigid with rods 39 secured to connection links 40 having one of their ends in engagement with crank levers 41 supported by means of brackets secured to portions of the combined conveyor and display rack 29; the crank levers 41 are actuated through rods 43 rotatably retained within the free ends of said crank levers, and having a screw threaded portion 44 in engagement with and projecting through a bearing plate 45 fixed to said rack 29; said projected screw threaded ends of the rods 43 having a handle 46 rigidly secured thereto and placed within reach of the operator. Consequently upon this, it will be understood that with operation of the handles 46, actuating the rod and link connections, will cause the arms 38 to swing in one direction or the other thereby increasing or diminishing the tension of the springs 37.

In addition, each compartment 31 of the combined conveyor and display rack 29 has secured to its lower end, a plate spring 47 adapted to support the lowermost package or can of merchandise placed within the compartment and prevents its accidental disengagement from the latter. This is assured by projecting the lower portion of the forward wall of each compartment at a point below the upper portion of the lowermost package or can of merchandise as is indicated at 48.

The exposed face of the projected portion 48 of the compartments 31, may be advantageously provided with a suitable holder 49 designed to receive price tags 50 or advertising matter, as conditions or preference may dictate.

From the foregoing description, the advantageous use of my improved store construction will manifest itself to anyone skilled in the art. The goods or articles of merchandise may be stored in the upper portion of the building from where the combined conveyor and display rack 29 may be filled and kept so.

The occupant of a vehicle, who wishes to make purchases, drives through the entrance 11. While passing the basket bin 18, an attendant attaches a basket 24 to a suitable part of the vehicle so that the basket will be convenient to receive goods therein. The occupant of the vehicle then drives through the run-way 10 and orders the articles desired, which are clearly displayed through the openings 33 formed transversely of the lower end of the compartments 31 in the combined conveyor and display rack 29. The attendant places the articles ordered in the basket 19 attached to the vehicle while the latter is driven through the building. The purchases terminated, the vehicle is driven to the cashier's desk 17, where the basket 19 is removed from the vehicle, whereupon the amount due for the purchases is determined, the packages or articles are wrapped and after payment has been made, the vehicle departs from the exit 12. The basket may then be returned to the entrance of the building by means of the conveyor 23 for subsequent use.

Figure 11:
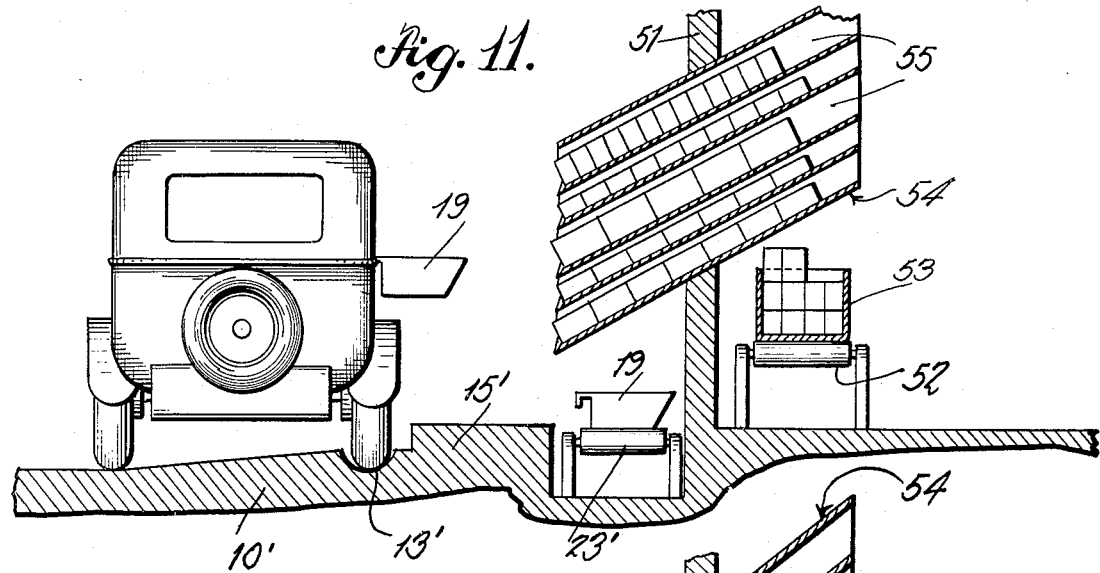
Figure 11 is a detail illustration of a modified form of construction.
Figure 12:
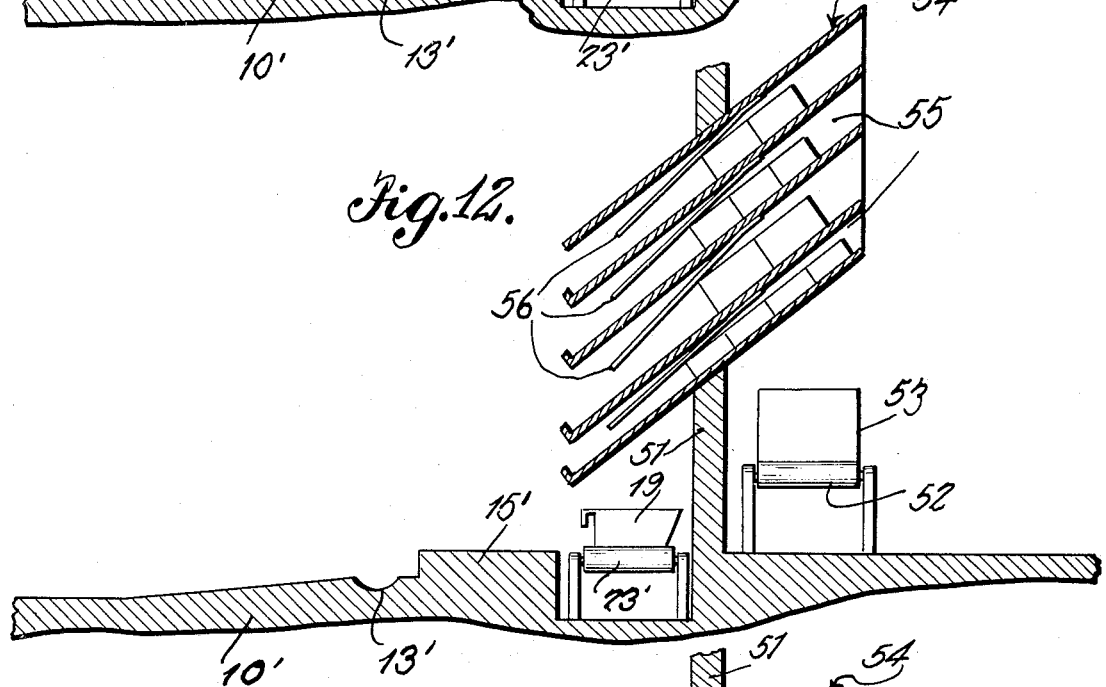
Figure 12 is a similar illustration showing the braking means within the combined conveyor and display rack.
Figure 13:
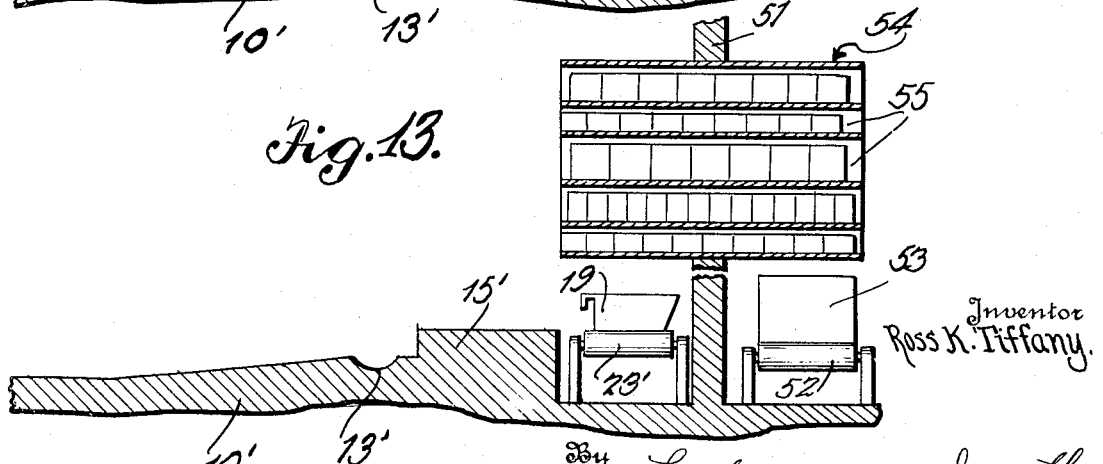
Figure 13 is a detail illustration of a further modification of the invention.

That the structure of my improved store may vary without departing from the gist of the invention, will be apparent from the modifications of the arrangement illustrated in Figures 11, 12 and 13, wherein the service section and the storage section are disposed on one floor, and separated by a suitable wall 51.

The service section is provided with the raised attendant's platform 15' on one side of which is arranged the vehicle runway 10' having a gutter 13' formed therein for guiding the wheels of the vehicle while traversing said runway, and on the other side of the raised platform 15' is disposed a belt or roll conveyor 23' serving to transport the baskets or receptacles 9 from one end of the building to the other.

In the storage section in close proximity to the separating wall 51, I may advantageously provide a suitable conveyor 52 adapted to conveniently carry a box or other receptacle 53 loaded with goods or articles of merchandise to be placed within the combined conveyor and display rack 54 extending through the separating wall 51 and establishing communication between the service section and the storage section of the store.

The combined conveyor and display rack 54 formed of a plurality of parallel compartments 55, may, as shown in Figures 11 and 12, be disposed to slant towards the service section, so that when the goods or articles of merchandise are placed within the compartments of the combined conveyor and display rack, they will naturally be guided towards the exhibiting openings in the service section. To prevent a too sudden fall of the goods within the combined conveyor and display rack, strips of spring metal 56, as shown in Figure 12, may be secured to one wall of each compartment and effect a braking action upon the falling goods. The combined conveyor and display rack 54 may also, as illustrated in Figure 13, be disposed horizontally and the goods or articles of merchandise may then be fed into said rack from the storage section and readily removed from the service section.

It will, therefore, be apparent and readily appreciated that I have provided a highly desirable form of building construction for serving motorists in their cars without having to leave the same and by means of which, service can be rendered in a most efficient and expedient manner.

Manifestly, the construction shown is capable of considerable modification, and such modification as is within the spirit of my claims I consider within the spirit of my invention.

I claim:—

1. A store construction comprising a service section having a run-way for vehicles, a storage section separated from the service section, a combined conveyor and display rack for the handling of merchandise from said storage section to the service section, and an attendant's platform positioned in the service section and arranged between said combined conveyor and display rack and the run-way within the service section.

2. A store construction comprising a service section having a run-way for vehicles, a storage section separated from the service section, a fixed conveying rack for the handling of merchandise from said storage section to the service section, said rack being adapted to receive and retain goods therein, the lower portion of said rack having transverse openings formed therein for displaying the goods arranged therein to the occupants of the vehicle traversing said run-way, and an attendant's platform positioned in said service section and arranged between said conveying rack and the run-way within the service section.

3. A store construction comprising a ground floor provided with a vehicle run-way, a service platform arranged on one side of the run-way on said ground floor, a top floor for storing goods, fixed conveying racks between the top and ground floors and leading to the service platform of the latter, said rack being adapted to receive and retain goods therein, and the lower portions of said rack having transverse openings formed therein for displaying the goods arranged within said rack to the occupants of the vehicles traversing said run-way.

4. A store construction comprising in combination with a lower service floor and an upper storage floor, of a combined conveyor and display rack arranged between said floors for directing goods from the upper storage floor to the lower service floor, the lower portion of said rack having a transverse opening formed therein for displaying the goods arranged in said rack, and permitting ready removal of the goods therefrom.

5. A store construction comprising in combination with a lower service floor and an upper storage floor, a combined conveyor and display rack arranged between said floors for directing goods from the upper storage floor to the lower service floor, the lower portion of said rack having transverse openings formed therein for displaying the goods received within said rack, and means associated with the rack for retarding the fall of the goods therein.

6. A store construction comprising in combination with a lower service floor and an upper storage floor, a combined conveyor and display rack arranged between said floors for directing goods from the upper storage floor to the lower service floor, the lower portion of said rack having transverse openings formed therein for displaying the goods received within the rack, spring actuated means associated with said rack for retarding the fall of the goods therein, and manually operated means for controlling the operation of said spring actuating means.

7. A store construction comprising in combination with a lower service floor and an upper storage floor, a combined conveyor and display rack arranged between said floors for directing goods from the upper storage floor to the lower service floor and formed of series of parallel compartments each adapted to receive and retain a certain line of goods therein, spring pressed plates associated with each of said compartments for retarding the fall of the goods received therein, and link connections associated with said plates and adapted to be manually operated to control the operation of the latter.

8. A store construction comprising in combination with a lower service floor and an upper storage floor, a combined conveyor and display rack arranged between said floors for directing goods from the upper storage floor to the lower service floor and formed of a series of parallel compartments adapted to receive and retain a certain line of goods therein, the lower portion of each of said compartments having transverse openings formed therein for displaying the goods arranged within the same, and the compartments of each series terminating one above the other.

9. A store construction comprising in combination with a lower service floor and an upper storage floor, a combined conveyor and display rack arranged between said floors for directing goods from the upper storage floor to the lower service floor and formed of a series of parallel compartments adapted to receive and retain goods therein, each of said compartments having a transverse opening formed therein for displaying the goods received within the same, and plate springs fixed to the lower portion of each compartment in said rack and below the display opening thereof for preventing the goods from accidental discharge from the compartment.

10. A store construction comprising a service section having a run-way for vehicles, a storage section, a partition separating the service section from the storage section, and a combined conveyor and display rack extending through said partition for directing goods from the storage section to the service section and displaying said goods to occupants of the vehicles traversing the run-way in said latter section.

11. A store construction comprising a service section having a run-way for vehicles, a storage section, a partition separating the service section from the storage section, a combined conveyor and display rack extending through said partition for directing goods from the storage section to the service section and displaying said goods in the latter section, and an attendant's platform positioned in the service section and arranged between said combined conveyor and display rack and the run-way within the service section.

12. A store construction comprising a service section having a run-way for vehicles, a storage section separated from the service section, a combined conveyor and display rack adapted to receive and retain goods therein and extending into both said service and storage sections, that portion of the rack extended into the service section having means for displaying the goods arranged within said rack and the portion of the rack extending into the storage section being open whereby the goods may be directed to the display portion of the rack in the service section directly from the storage section.

13. A store construction comprising a service section having a run-way for vehicles, a storage section separated from the service section, a combined conveyor and display rack adapted to receive and retain goods therein and extending into both said service and storage sections, that portion of the rack extending into the service section having means for displaying the goods arranged within said rack, and the portion of the rack extending into the storage section being opened whereby the goods may be directed to the display portion of the rack in the service section directly from the storage section, and an attendant's platform positioned in the service section and arranged between said combined conveyor and display rack and the run-way within the service section.

In witness whereof I have hereunto set my hand.

ROSS K. TIFFANY.